United States Patent Office 3,054,009
Patented Sept. 11, 1962

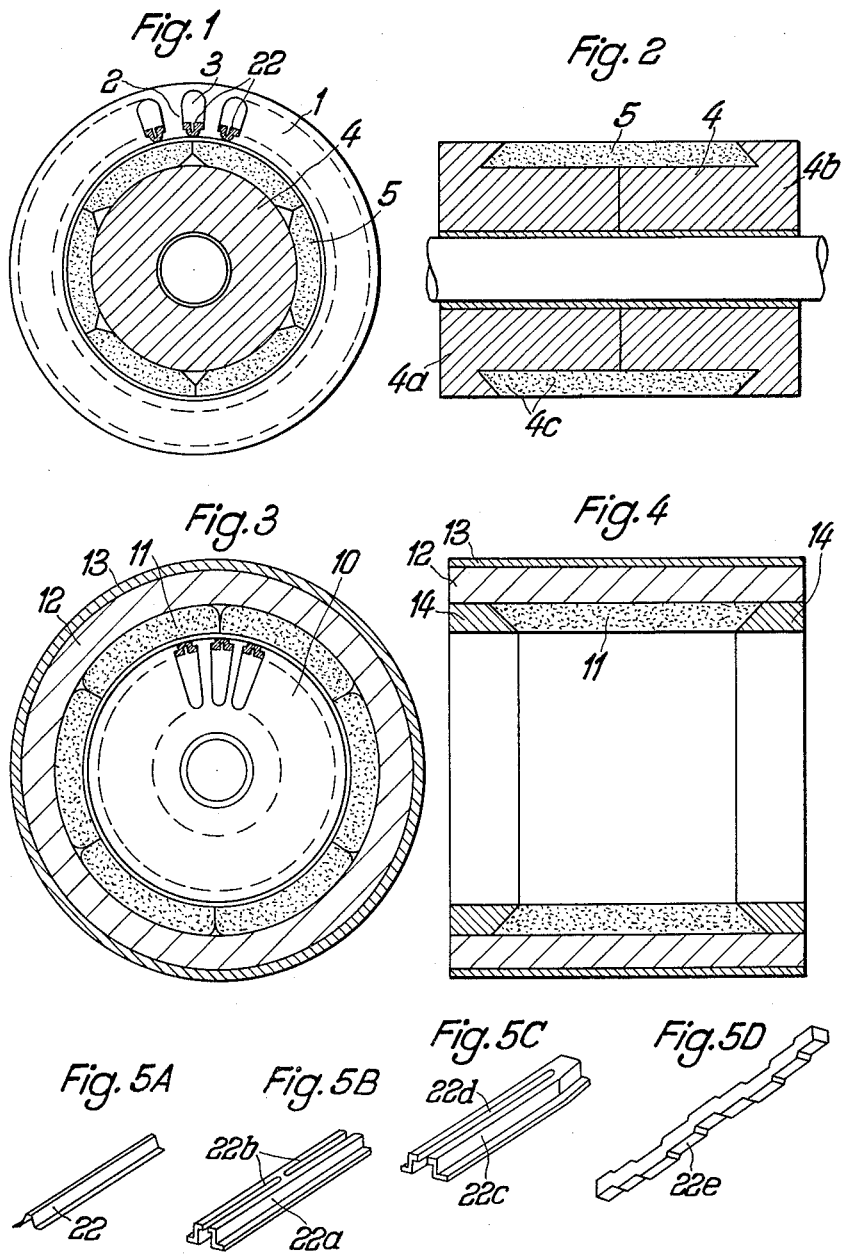

3,054,009
SLOT CLOSERS FOR HYSTERESIS MOTORS
Hermann Papst, 1 Karlmeierstrasse, St. Georgen,
Schwarzwald, Germany
Original application July 8, 1954, Ser. No. 444,055.
Divided and this application Feb. 24, 1958, Ser. No. 717,227
4 Claims. (Cl. 310—214)

The subject matter of the instant application is divided out of my copending application Serial Number 444,055, filed July 8, 1954, now Patent No. 2,834,895.

The instant invention relates to a rotary field system with hysteretic operation and comprising a primary member producing a rotating field, and a secondary member, including hysteretic material, which members are relatively rotatable to each other. More particularly the invention relates to systems of the type in which the primary and secondary members have cooperating cylindrical surfaces defining an annular air gap and in which the primary member is provided with a plurality of radial slots or grooves containing the field windings, which slots or grooves are spaced circumferentially.

An object of the instant invention is to provide means for increasing the power, efficiency and performance of hysteresis motors by providing means partially or completely closing the field winding slots and grooves of the primary after the field windings have been disposed therein.

I accomplish the foregoing, and other, objects by making the closure member of magnetic material and inserting it into the open end of the groove under spring tension in such manner that the surface of the insert is substantially a continuation of cylindrical surface of the primary member which defines one face of the air gap. Such shaping and positioning of the closure members results in an increase of the power which is several times, for example, the power obtainable from the same motor without the magnetic inserts of the invention. In addition there is the advantage that the motor so provided with the closure inserts of this invention runs extraordinarily smoothly and quietly.

The primary member may be the stator or rotor, and may, in addition, be the outer or inner member of the motor. The same applies to the secondary member. Of all the possible constructions, particular importance must be accorded to that embodiment in which the primary member is the central stator and the secondary member is the outer rotor. In such embodiment, firstly, the windings and the wedges are not subjected to centrifugal force, and, secondly, the hysteretic layer which is here enveloped by the external shell of the secondary member, is but negligibly endangered so that material of lower tensile strength may be used in the manufacture of the hysteretic layer.

The instant invention will more readily be understood from the following description of embodiments thereof, taken in conjunction with the appended drawing, in which:

FIG. 1 is cross-section of a motor in accordance with this invention with an internally positioned secondary member;

FIGURE 2 is a longitudinal section through the motor secondary member of FIGURE 1;

FIGURE 3 shows a cross-section of a second embodiment of the motor of this invention with an external secondary member;

FIGURE 4 shows a longitudinal section through the secondary member of the motor of FIGURE 3; and FIGURES 5A and 5D are perspective views of the closure wedges of this invention for insertion into the slots or grooves for the field windings between the pole shoes of the primary member.

The first embodiment of the motor in accordance with this invention, shown in FIGURES 1 and 2, comprises a primary member 1 supporting the pole shoes 2, the primary member being provided with a plurality of radially extending grooves or slots 3 in the cylindrical surface thereof for receiving the field-producing windings, and a secondary member having a carrier 4 with a hysteretic layer consisting of a plurality of segments 5. Primary member 1 may be constructed as the rotor, in which case the secondary 2 is the stator, or as the stator, in which case the secondary is the rotor. As shown in FIGURE 2, the carrier 4 consists of two halves 4a, 4b which may be united by means of screws or bolts to form a dove-tailed annular groove 4c for the insertion and clamping of the hysteretic segments 5.

In the second embodiment of a motor according to the invention shown in FIGURES 3 and 4, the primary member 10 is innermost and is surrounded by the secondary member. The secondary member consists of the hysteretic layer of segments 11 facing the primary member, and a carrier 12 of magnetically non-conductive material, for example aluminum, as well as a ferromagnetic outer envelope or shell 13. In this embodiment likewise, the primary member may be either the stator or the rotor, and the secondary correspondingly the rotor or stator.

In both embodiments, each slot or groove 3, having positioned therein the field winding of the primary member, is sealed by a wedge-shaped insert 22. FIGURES 5A to 5D show different specific embodiments of these units or inserts which are of a magnetic material and hence contribute to improve the field characteristic of the primary member. By the use of the magnetic closure inserts an extraordinarily noiseless operation of the hysteresis motor is obtained.

Insert 22 of FIGURE 5A consists of a strip of V-shaped magnetic material which on insertion into the grooves of the primary is readily compressed and hence in situ is under spring tension. Insert 22a of FIGURE 5B is of U-shape, and in this embodiment springiness in the circumferential direction is imparted to the insert upon insertion thereof in a groove by aligned longitudinal slits 22b in the end portions of the insert. Insert 22c of FIGURE 5C is similar to that of FIGURE 5B but a single lengthwise slit 22d is provided for obtaining springiness. Insert 22c of FIGURE 5D is a stepwise, offset rod of which the steps are so formed that the rod insert takes on overall wavelike shape, permitting of insertion thereof under tension into a groove 3. It is to be expressly noted that in each embodiment, although FIGURES 1 and 3 show the insert as embodiment 22, any of the embodiments 22a, 22c and 22e may be used in place of embodiment 22.

What I claim is:

1. Hysteresis motor comprising a field-producing primary member bounded by a first cylindrical surface, a plurality of slots circumferentially spaced on the first cylindrical surface into the primary member, each slot being of lesser arcuate width at its open end region than at the region remote from its open end, at least one field winding in the slots, a secondary member bounded by a second cylindrical surface of hysteretic material and defining an annular air gap with the first cylindrical surface, the primary and secondary members being rotatable relative to each other, and a magnetic closure member in the open end of each slot of the plurality, the closure member being of such configuration as to be of high magnetic reluctance at its midregion and so positioned as to have at least a region of its outer face substantially flush with the first cylindrical surface.

2. Hysteresis motor according to claim 1 in which the magnetic closure members of such configuration as to be compressible axially their length on insertion into the slots and are of spring metal to maintain them under tension in their positions in the slots.

3. Hysteresis motor according to claim 1 in which the closure member defines at least one elongated aperture in the longitudinal midregion of the closure member.

4. Hysteresis motor of increased efficiency comprising a field producing primary member bounded by a first cylindrical surface, a plurality of slots circumferentially spaced in the first cylindrical surface and extending into the primary member and of a width less at their open end region than at their adjacent intermediate region, at least one field winding in the slots, a secondary member bounded by a second cylindrical surface of hysteretic material and defining an annular gap with the first cylindrical surface, the primary and secondary members being coaxially supported and relatively rotatable, and a magnetic slot bridging element in each slot with the outer face of the bridging element comprising a substantially aligned continuation of the first cylindrical surface, the elongated lateral faces of the bridging element being resiliently pressed against the slot defining walls, and the bridging element defines at least one elongated narrow, longitudinal gap.

References Cited in the file of this patent

UNITED STATES PATENTS

| | | |
|---|---|---|
| 941,180 | Young | Nov. 23, 1909 |
| 1,260,674 | Jackson | Mar. 26, 1918 |
| 2,041,875 | Stoller | May 26, 1936 |
| 2,134,795 | Myers | Nov. 1, 1938 |
| 2,423,345 | Roters | July 1, 1947 |

FOREIGN PATENTS

| | | |
|---|---|---|
| 888,719 | Germany | Sept. 3, 1953 |